US007882008B2

(12) United States Patent
Mahajan et al.

(10) Patent No.: US 7,882,008 B2
(45) Date of Patent: Feb. 1, 2011

(54) APPARATUS, METHODS AND ARTICLES OF MANUFACTURE FOR COMPUTERIZED TRANSACTION EXECUTION AND PROCESSING

(75) Inventors: Umesh Mahajan, Metuchen, NJ (US); Engin Tekkoc, Edison, NJ (US)

(73) Assignee: Goldman Sachs & Co., New York, NY (US)

(*) Notice: Subject to any disclaimer, the term of this patent is extended or adjusted under 35 U.S.C. 154(b) by 1754 days.

(21) Appl. No.: 09/824,305

(22) Filed: Apr. 2, 2001

(65) Prior Publication Data

US 2002/0143690 A1 Oct. 3, 2002

(51) Int. Cl.
*G06Q 40/00* (2006.01)
(52) U.S. Cl. ........................................ 705/37
(58) Field of Classification Search ............... 705/35
See application file for complete search history.

(56) References Cited

U.S. PATENT DOCUMENTS

| 6,408,282 | B1 * | 6/2002 | Buist ......................... 705/36 R |
| 6,477,521 | B1 | 11/2002 | Kumomura et al. |
| 6,766,304 | B2 * | 7/2004 | Kemp et al. ................ 705/36 R |
| 2002/0046146 | A1 | 4/2002 | Otero et al. |
| 2002/0046149 | A1 | 4/2002 | Otero et al. |
| 2002/0049661 | A1 | 4/2002 | Otero et al. |
| 2002/0073059 | A1 | 6/2002 | Foster et al. |
| 2002/0104067 | A1 | 8/2002 | Green et al. |

FOREIGN PATENT DOCUMENTS

| JP | 05298347 A | 11/1993 |
| WO | WO 00/65510 A1 | 11/2000 |
| WO | WO 00/70524 A1 | 11/2000 |

OTHER PUBLICATIONS

"European Patent Communication", mailed Jun. 14, 2005, for 02 721 615.9.

* cited by examiner

*Primary Examiner*—Richard C Weisberger
(74) *Attorney, Agent, or Firm*—Chadbourne & Parke LLP; Walter G. Hanchuk

(57) ABSTRACT

Apparatus, methods and articles of manufacture for n-tier transaction execution and processing are shown. The first layer comprises a presentation layer in the form of a user interface for entering instrument orders, modifying orders, and monitoring orders, instruments and markets. The second layer comprises an intermediate component layer for information transfer, and the third layer comprises an information source layer for feeding information to and accepting information from the first two layers.

12 Claims, 9 Drawing Sheets

|   | Price | Size | Tot. Size | Av. Price |
|---|---|---|---|---|
| 6 | 6256.5 | 1 | 6 | 6254.7 |
| 5 | 6256.0 | 1 | 5 | 6254.3 |
| 4 | 6255.5 | 1 | 4 | 6253.9 |
| 3 | 6254.5 | 1 | 3 | 6253.3 |
| 2 | 6253.0 | 1 (34) | 2 | 6252.7 |
| 1 | 6252.5 | 1 | 1 | 6252.5 |
| 1 | 6246.5 | 2 | 2 | 6246.5 |
| 2 | 6245.0 | 26 (38) | 28 | 6245.0 |
| 3 | 6243.0 | 2 | 30 | 6244.9 |
| 4 | 6240.5 | 1 | 31 | 6244.8 |
| 5 | 6240.0 | 1 | 32 | 6244.7 |
| 6 | 6238.5 | 2 | 34 | 6244.3 |
| 7 | 6238.0 | 1 | 35 | 6244.1 |

Figure 8

Figure 9

APPARATUS, METHODS AND ARTICLES OF MANUFACTURE FOR COMPUTERIZED TRANSACTION EXECUTION AND PROCESSING

FIELD OF THE INVENTION

This invention relates to apparatus, methods and articles of manufacture for computerized transaction execution and processing. More particularly, this invention relates to apparatus, methods and articles of manufacture for n-tier transaction execution and processing.

COPYRIGHT RIGHTS

A portion of the disclosure of this patent document contains material which is subject to copyright protection. The copyright owner has no objection to the facsimile reproduction of the patent document or the patent disclosure, as it appears in the Patent and Trademark Office patent files or records, but otherwise reserves all copyright rights whatsoever.

BACKGROUND OF THE INVENTION

Properly and efficiently routing financial instrument transactions is necessary in order to insure accuracy in those transactions. For example, the value of any financial instrument may change in extremely brief periods of time, and this potential effect of time on value complicates transactions. In order to decrease any complications imposed by the time effect on value, and more properly and efficiently enter and route financial instrument transactions, a system and/or tool could be provided to the trader to assist in financial instrument transactions.

Any system or tool provided to the trader to assist in financial instrument transactions should provide the trader with market and/or instrument monitoring. If the system or tool provides market and/or instrument monitoring to the trader, the trader can understand any possible changes in value of the instrument as time passes, and plan future trades. For example, if a trader was aware that the market for Stock X is slumping, he or she would probably not buy calls in Stock X (the right to purchase stock X in the future at a predetermined price.) Yet if he or she was not aware of the slumping market conditions, and continued to buy calls on the expectation the price will rise, he or she would most likely experience losses in the market. Thus a market and/or instrument monitoring system or tool would assist the trader in decreasing any complications that might be imposed by the time effect on value.

A market and/or instrument monitoring system or tool alone, however, does not fulfill the trader's needs. The trader also needs a system and tool designed to decrease complexity in other ways. This system and tool should, for example, provide the trader with the ability to enter his or her orders, as quickly as possible, in order to minimize any effect time might have on the value of the instrument and so decrease the trader's exposure to possible changing value. Additionally, even though the vast majority of trades are intended to be made, the trader may occasionally change his or her mind about the trade, or desire to pause or "park" the trade for a future time or date. Thus, the system or tool should also provide the trader with a number of modification abilities, for example, the ability to modify orders by changing his or her trade before execution, the ability to pause or park any trade before execution, and the ability to abort any trade before execution.

In addition to providing modification of orders, quick order entry, and market and/or instrument monitoring, any system and tool used to assist in financial instrument transactions should also provide the trader with the ability to monitor the trades he or she has made. Monitoring trades provides the trader with the ability to understand his or her overall position and modify or sustain that position as desired.

In addition to monitoring trades, order modification, quick order entry, and market and/or instrument monitoring, it would also be helpful if a system or tool for executing financial transactions aided in processing those transactions by routing the orders to the exchanges for the instruments. The trader would be well served by having a routing link to the exchange so that his or her trades are executed as soon as possible. A system or tool that executes trades as soon as possible would help limit any time effect on the trade value. That is, since an instrument's value may change in fractions of a second, a routing link to an exchange would assist timely occurrence of the trade by practically contemporaneously executing the trade as the trader enters the trade. This practically contemporaneous execution—minimizing trading lag time—would help preserve the trader's understanding of the value of his or her trade by minimizing any change in the value of the instrument during the time span between the decision to trade, the order entry and the execution of the trade.

Finally, in addition to the desired attributes identified above, a trading system and tool should be flexible, so that it can be used to trade as many instruments as possible, on as many exchanges as possible; user-configurable, so the trader can customize the system or tool as he or she desires; and reliable, so that the trader can consistently use the system and tool without concern as to system conditions.

Accordingly, it is an object of the present invention to provide a system and tool to a trader to assist in properly and efficiently routing financial instrument transactions.

It is a further object of the present invention to provide a system and tool to a trader that minimizes any time lag in entering and executing financial instrument transactions.

It is a further object of the present invention to provide a system and tool to a trader that is flexible, user customizable and reliable.

BRIEF DESCRIPTION OF THE DRAWINGS

FIG. 4 is an example of an interface of a preferred embodiment.

FIG. 4A is an example of an interface of a preferred embodiment.

FIG. 5 is an example of an interface of a preferred embodiment.

FIG. 5A is an example of an interface of a preferred embodiment.

FIG. 8 is an example of an interface of a preferred embodiment.

FIG. 9 is an example of an interface of a preferred embodiment.

SUMMARY OF THE INVENTION

The present invention comprises methods, apparatus and articles of manufacture for executing and processing financial transactions, including derivative trades, over a computerized network in an n-tier. The present invention also comprises methods, apparatus and articles of manufacture for entering orders, modifying orders, monitoring trades, instruments and markets, and routing orders. These methods, apparatus and article of manufacture comprise: a presentation layer interface and software for trader interaction; an intermediate component layer, which supply the trader interface and software with information as well as route orders and transfer information from the interface; and an information source layer, which provide market, instrument and other information to the intermediate component layer and route orders and transfer information from the intermediate component layer to exchanges and other resources.

In the preferred embodiments, the interface and software for trader interaction is comprised of a workspace or workspaces, which in the especially preferred embodiments is comprised of a graphic user interface and C++ programming, the intermediate components are implemented as Microsoft Component Model Objects (COM) objects, and the information sources are implemented as databases and data feeds.

The interface and software are customizable according to user preferences. Any such customization, in turn, may modify the particular intermediate components and information sources used in the particular customized version.

DETAILED DESCRIPTION OF THE PREFERRED EMBODIMENTS

Figure 1:
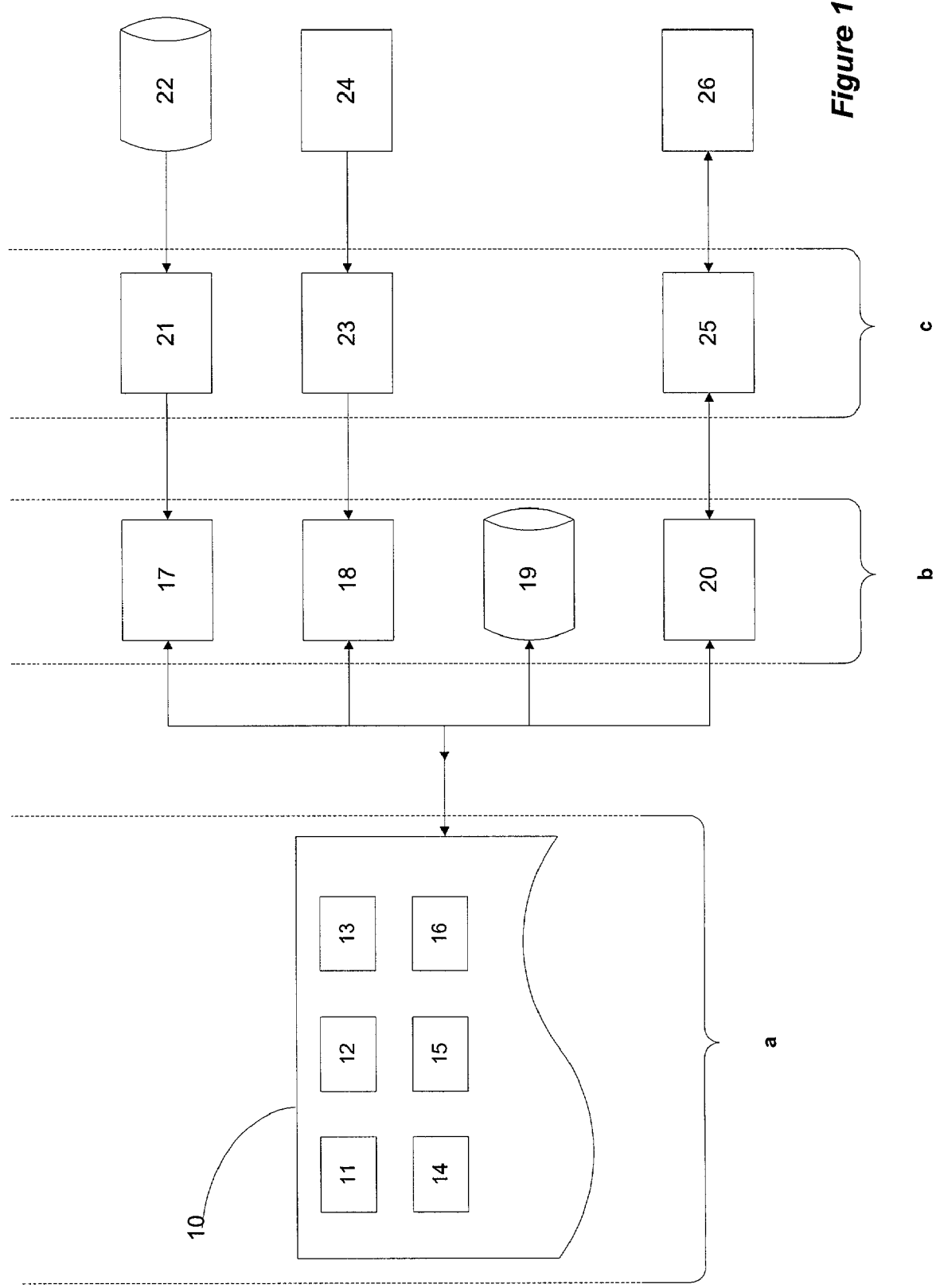
FIG. 1 is an example of a preferred embodiment.

FIG. 1 shows a schematic diagram of a preferred embodiment of the present invention. The presentation layer interface and software for trader interaction is shown generally at a. In the preferred and other embodiments, the interface and software for trader interaction provides the trader with the ability to enter orders quickly, modify those orders, and monitor orders, instruments and the markets.

In the embodiments of FIG. 1 and other preferred embodiments, the trader interface and software is comprised of a workspace or workspaces, which is, in the embodiment of FIG. 1, one or more graphical user interfaces (GUI). The GUI shown generally at 10, may be configured in numerous ways, as will be further described below, and is, in turn, comprised of several sub interfaces or windows; Order Entry 11, MarketWatch 12, MarketDepth 13, OrderView 14, Executions 15 and Spread/Options Matrix 16. The sub interfaces or windows of the GUI shown in the embodiment of FIG. 1 may be changed as desired, as explained below. Moreover, the GUI example shown in FIG. 1 is an example of one possible iteration of the interface. In other preferred embodiments, the GUI may be different. Additionally, in other embodiments the trader interface may be different, e.g., a combination of GUI and text based interfaces, a entirely text based interface, etc.

In the preferred embodiments the interface is provided in a Windows® NT environment and is constructed using C++. However, any environment known in the art may be used, and it should be specifically understood that embodiments can be implemented in environments that support GUI and other interfaces, including but not limited to Microsoft Windows® 2000, Windows® 95, 98 and Me, Unix® and Unix®-like platforms, including but not limited to Linux® and its variants, as well as other operating system platforms including but not limited to IBM OS/390, MacOS, VxWorks.® Additionally, embodiments may be constructed in languages known in the art such as Java®, etc. This interface will be described in further detail below.

Returning to FIG. 1, and the embodiments therein, the intermediate component layer are shown generally at b. In the preferred and other embodiments, the intermediate components route orders from the trader interface and supply the trader interface and software with market, instrument or product information (the terms "instrument" and "product" are used interchangeably herein) and other information. The intermediate components also transfer information from the interface. In the embodiments of FIG. 1 and other preferred embodiments, the intermediate components are: Product Master 17, Market Data 18, User Profile 19, and OMA Extensions 20, which are described in further detail below. These components are stored in this embodiment on a server or servers and linked to the interface by any method or methods known in the art. The intermediate components are created as Microsoft Component Object Model (COM) objects in this embodiment in an Windows® NT environment, however, other code and environments known in the art may be used as well. COM objects are used in the especially preferred embodiment because they can be revised across delivery channels and can take advantage of pre-built components. However, other code and methods known in the art, e.g. using an object-oriented language such as Java®, can be used to construct the intermediate components.

The intermediate components, in the preferred embodiments, may be those shown in the embodiment of FIG. 1 or other components. The particular intermediate components used in the particular embodiment are determined, at least in part, by the nature of the trader interface and associated software. For example, the sub interfaces or windows shown in section a of the embodiment of FIG. 1 assist in determining the particular intermediate components shown in section b of the Figure. This interface will be described in further detail below.

Also seen at FIG. 1, at section c, are the information source layer of the embodiment. The information sources route orders from sections a and b, provide market, instrument and other information to the intermediate components, and transfer information from the intermediate components to exchanges and other resources. The information sources of the embodiment of FIG. 1 comprise: Product Server 21, Feed Handler 23, and Order Interface 25. These provide real-time updates of market, instrument or other data, such as instrument database 22 or data feed 24, as well as links to the exchanges, such as exchange link 26. These sources may be constructed by any method or methods known in the art, and they are described in further detail below.

The information sources, in the preferred embodiments, may be those shown in the embodiment of FIG. 1 or other components. The particular information sources used in the particular embodiment are determined, at least in part, as are the intermediate components, by the nature of the trader interface and associated software. For example, the sub interfaces or windows shown in section a of the embodiment of FIG. 1 assist in determining that the particular intermediate components shown in section b of the Figure, and, in turn, the particular intermediate components shown in section b will assist in determining the particular information sources of the embodiment.

Figure 2:
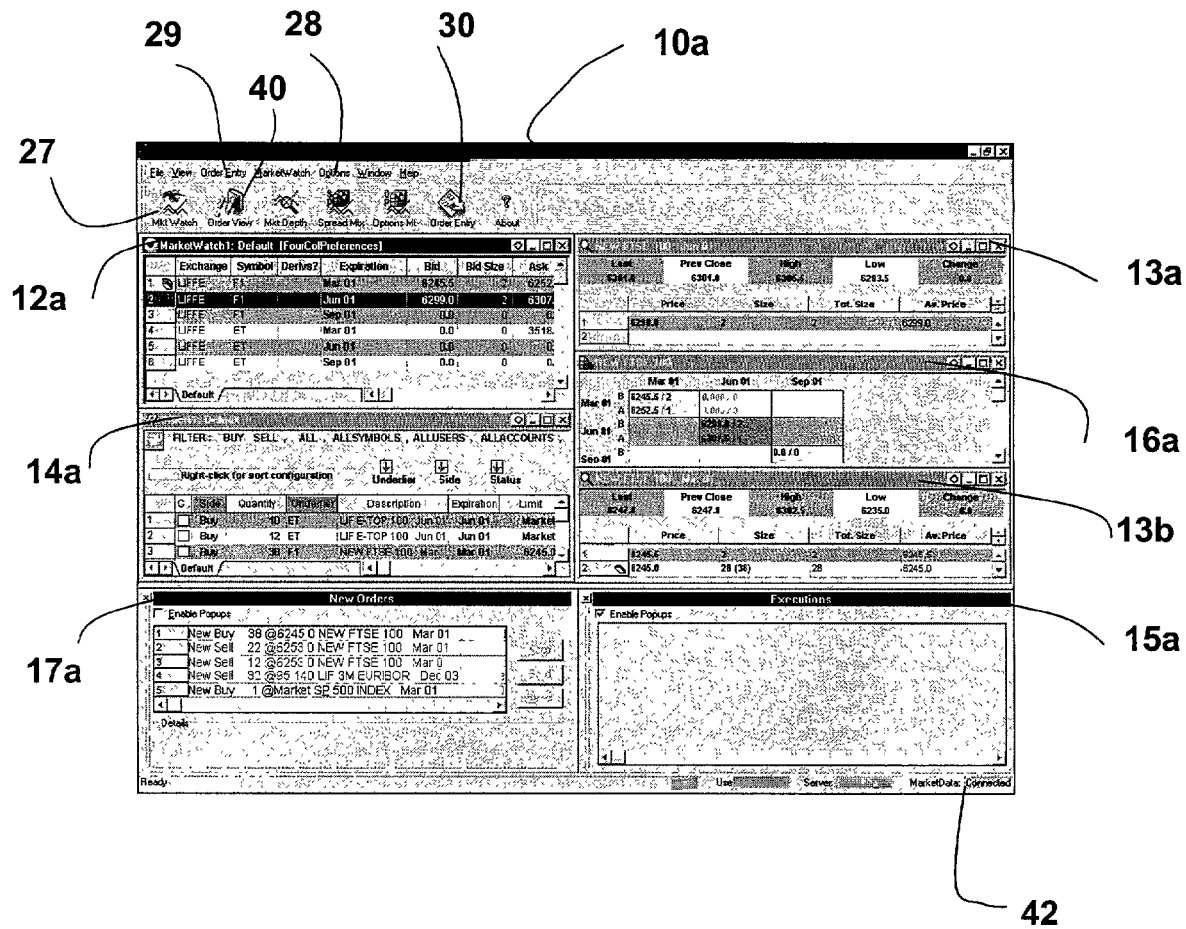
FIG. 2 is an example of an interface of a preferred embodiment.

Turning now to FIG. 2, a trader interface of a preferred embodiment is shown. The interface of this embodiment comprises a workspace, shown generally at 10a, with a number of windows; MarketWatch 12*a*, Market Depth 13*a* and 13*b*, Order View 14*a*, Executions 15*a*, Spread/Options Matrix 16*a*, and New Orders 17*a*. Not show in FIG. 2, but accessible through either the Order Entry menu 29, or from selection of an Order Entry icon 30, is an Order Entry window, which provides the user with the ability to enter orders for the financial product in this embodiment.

The workspace is customized from the default configuration. The default configuration will, in the preferred embodiments, open New Orders and Executions windows automatically when the user first logs onto the system. Other workspaces may then be opened as desired. Of course, the user may set his or her preferred configurations to open a workspace or workspaces other than the default workspace, such as, for example, a workspace like that seen in the example of FIG. 2. For example, the user may create a specialized workspace for any given day or exchanges, trades and/or information, e.g., a Friday workspace anticipating the release of unemployment reports. A user might also create numerous windows within a workspace or workspaces, such as multiple Order View windows to track especially heavy trading activities, multiple MarketWatch windows; etc. A user might also create more than one workspace to open at the same time, configured in similar or different ways.

The workspace shown in FIG. 1 can be customized by selecting the icons 27 at the top of the interface, so for example, the Order View, MarketWatch, Spread Matrix, and Market Depth sub interfaces or windows can be selected by the user's choice of the appropriate icons. The user can also use a Preferences option (depending from the Options menu 28 in a manner not shown) to customize the workspace to, inter alia:

Select the exchanges and product types (displayed on the Product Selector window described below);

Selection of defaults for the Order Entry window described herein, (e.g., the upper limit that can be entered in the Quantity field for each underlier and default account selected in the Account field);

Selection of information display in the Market Depth window, (e.g., level of market depth);

Selection of real-time market data to be displayed in Order Entry and Order Details windows;

Alteration of row and text colors of all windows;

etc.

Figure 3:
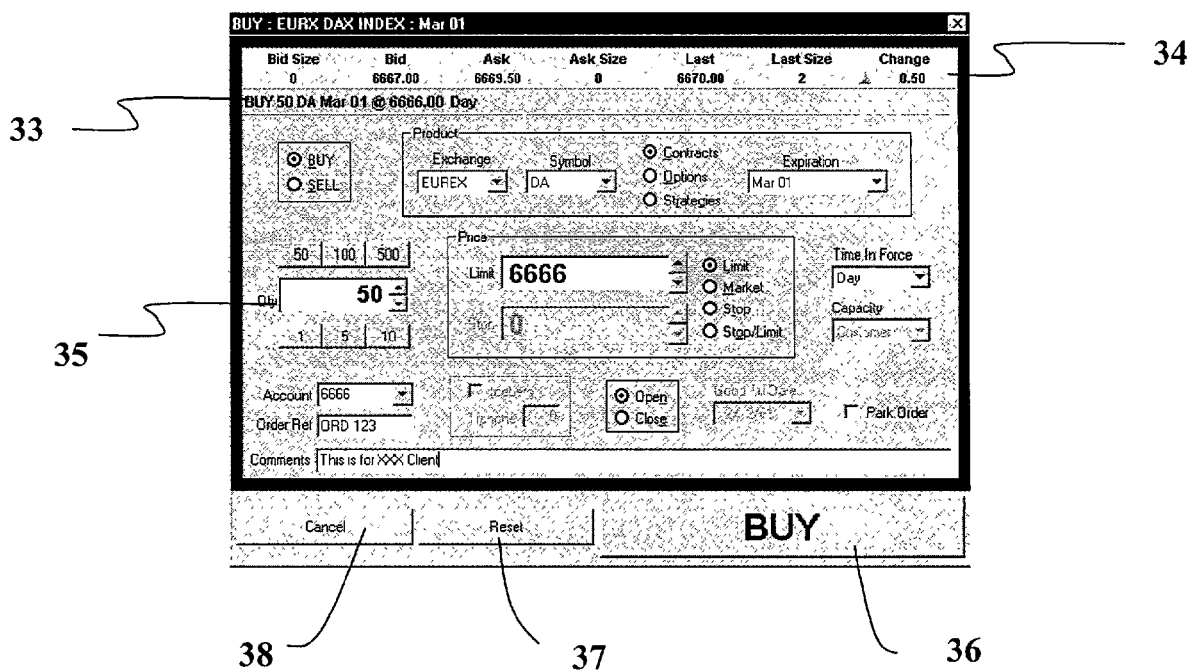
FIG. 3 is an example of an interface of a preferred embodiment.

The interface of the preferred embodiments also allow for order entry. An order entry sub window or interface may be included in a workspace or workspaces as desired, or may be selected separately, as referred to above. FIG. 3 shows an example of an Order Entry window. An Order, summarized at the section shown at 33, can be constructed through selection of the appropriate buttons, as seen generally at 35. In this example, the order is to buy 50 contracts of DA (Groupe Danone), with a maximum price of $6666.00, for one day. At 34 is seen a Market Data section or area for displaying information about the product, such as current bid and ask price for the product, etc. In the preferred embodiments, as many fields as possible are pull-down menus, as shown by the arrows in the field boxes.

When the user has completed their selections on the Order Entry window shown in FIG. 3, the user will then select either the 'Buy' button 36 to execute the transaction, the "Reset" button 37 to clear or reset the fields, or the "Cancel" button 38 to cancel the order. The "Buy" button of this embodiment includes both buying and selling. In other embodiments, there may be more than one button to buy and sell, such as a dedicated Buy and dedicated Sell button. A user also has the capability to clone or copy orders onto another Order Entry window, as well as park the order for later execution.

Note in FIG. 3 that several of the fields such as "Capacity", "Stop", etc. are grayed out and not available to the user to enter data. The preferred embodiments, once the product is recognized, will make available only product relevant fields. As with the user's ability to choose and customize information presented by the preferred embodiments, described herein, a preferred embodiment may minimize the information provided to the user to only that which is necessary to the user.

Figures 4, 4A:
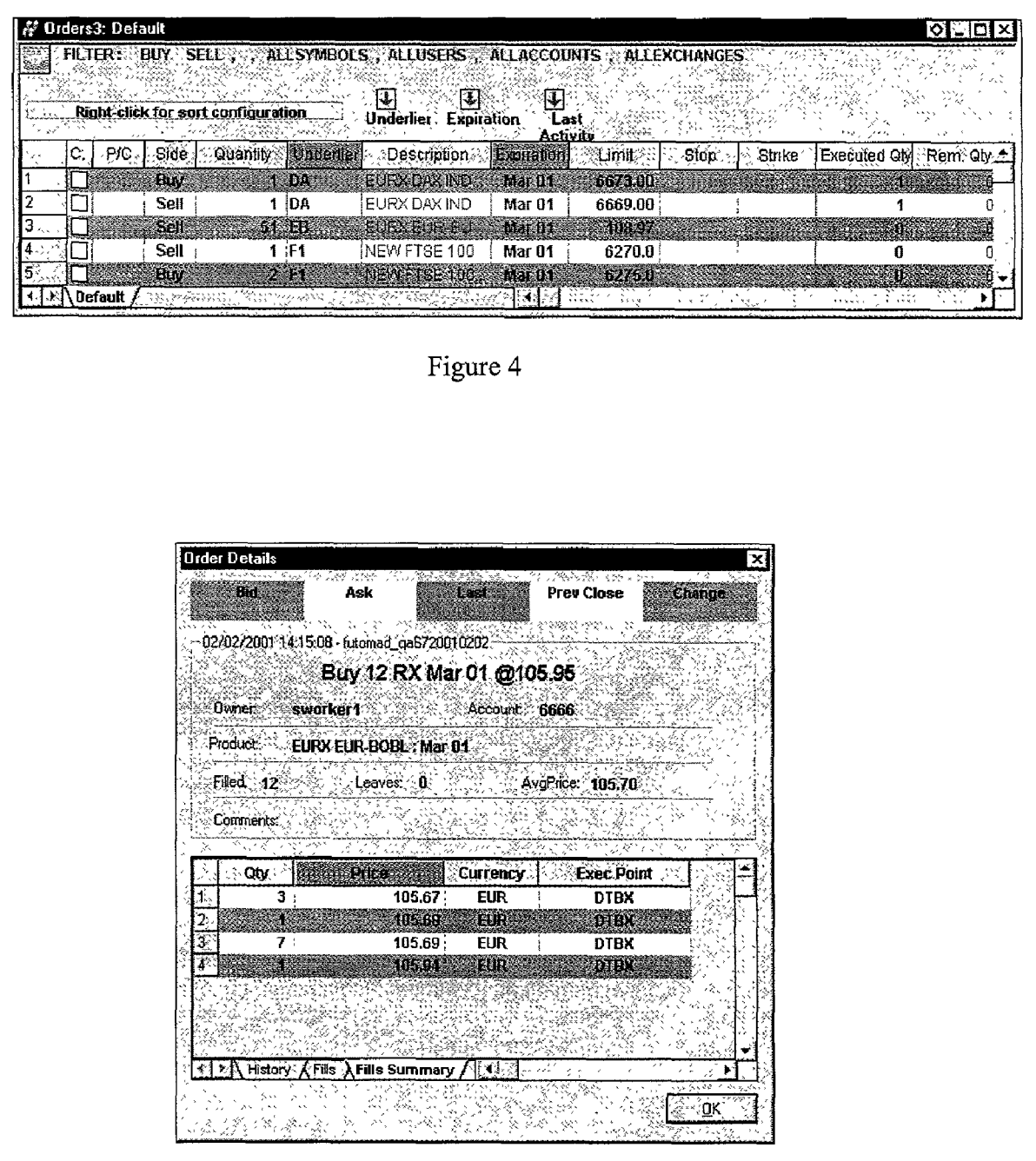

Once an order is entered, it may be viewed by way of an Order View window, of which an example is seen at FIG. 4. The Order View window tracks all orders for which the user has access from the time the orders are entered until their execution. These orders are called "pending orders" or "working orders." The user has the capability to customize the window in a number of ways. For example, the user may add or delete columns, in order to show desired information, or set filters for various tabs, e.g. new orders only, completed orders only, etc. The user may also create multiple windows, display other windows such as the MarketDepth or Order Details windows described below, or manipulate the columns within the windows. In addition, the user may cancel orders or reject orders.

Returning briefly to FIG. 2, an Order View icon is available from the workspace. The Order View can be customized as well, by altering the columns displayed, filtering the data in the columns, etc. At any time, the user can open other Order View windows. In this embodiment only one Order View window is active at a time.

The Order View window may also used to invoke an Order Details window, seen in FIG. 4A. The Order Details window monitors for an order in this embodiment by displaying the details of the order including real-time market data concerning any order. In the example of the Figure, the order to buy 12 RX contracts at a price of $105.95, until March 1, is displayed. The order information also includes the account name and number and product information. In addition, aggregate information is also displayed. Aggregate information may show how many high and low bids and volumes are above and below the user's price. In this example, the aggregate information only shows low bids. Using those low bids, the entire order has been filled for an average price of $105.70.

The aggregate information can also be displayed in various preferred embodiments, with the system offering to calculate, or automatically calculating, the aggregate pricing of the transaction. The calculation and/or display of the aggregate information provides the user with a helpful method of understanding where his or her order may be filled, and from what buy and sell offers. The aggregate information is calculated cumulatively during the day in this embodiment, but of course other embodiments may calculate the aggregate information on different time intervals. In the especially preferred embodiments using aggregate display, the order can be executed through that display. In addition to allowing a user to view the aggregate pricing of an instrument, as mentioned above, aggregation may be used to show the details of the user's trading activity for a given financial product for a given period of time, usually one trading day.

Figures 5, 5A:
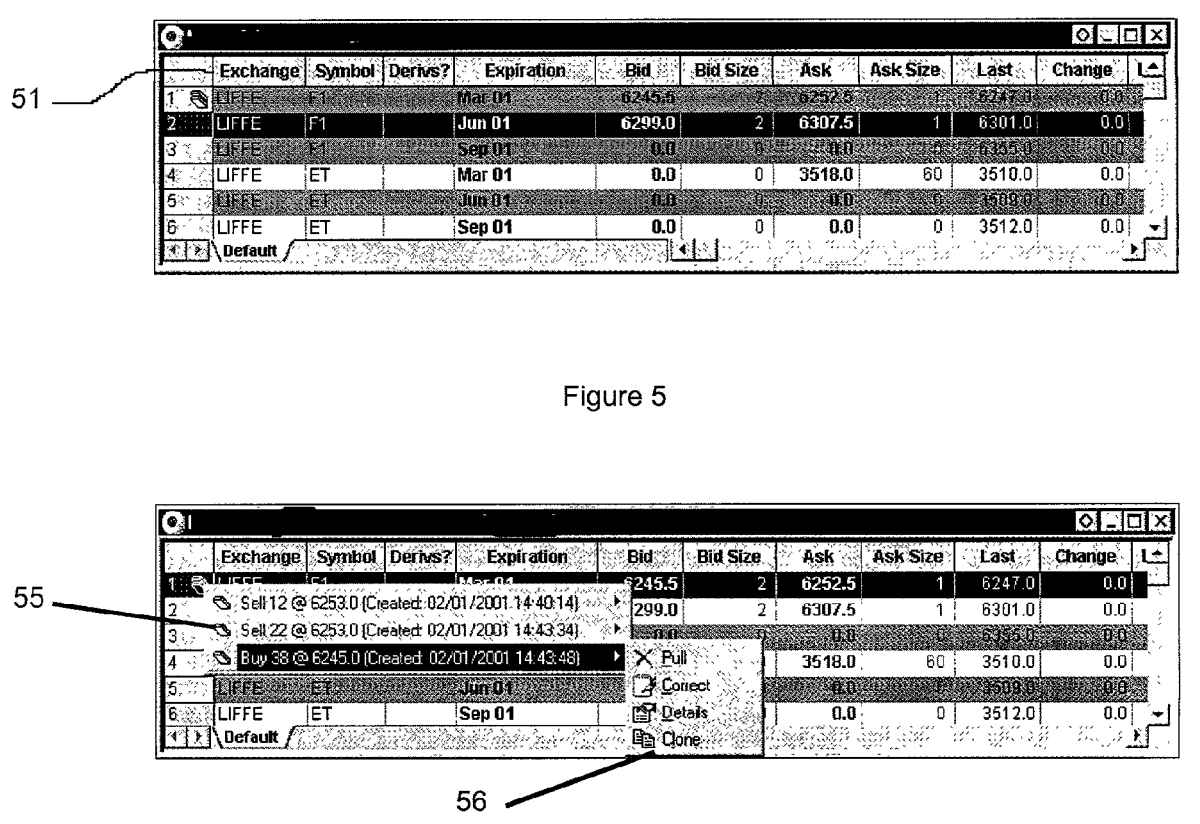

FIG. 5 is an example of a MarketWatch window. The MarketWatch window tracks market information for the selected products in real-time. As product prices are updated, they appear briefly on the MarketWatch window. In a preferred embodiment, out-of-date or unavailable prices are displayed in another color or type, for example gray italics.

A MarketWatch menu is available from the menu bar of the Workspace window. The MarketWatch window contains several available columns of information 51. The default column headings are customizable to display only the fields of information that the user wants to display. The user selects which columns he or she wants to display by expanding or collapsing the columns. As an alternate, the user may desire to have several MarketWatch windows and tabs available.

From the MarketWatch window, a user can monitor and modify orders using another indicator called, in this embodiment, the My Order Indicator. FIG. 5A is an illustration of how modifications are made from the MarketWatch window. In a preferred embodiment, sub-windows 55 and 56 are displayed. The user may review the trades in sub window 55 and pull any particular order, correct an order, display details of an order or clone or duplicate an order.

The MarketWatch window may also be used to enter orders. Referring again to FIG. 5 the user will select either the 'Bid' price to sell or the 'Ask' price to buy the product. After the selection is made an Order Entry window appears and displays the selected MarketWatch information. The user then selects either the Buy or Sell buttons to enter the order.

Figure 6:
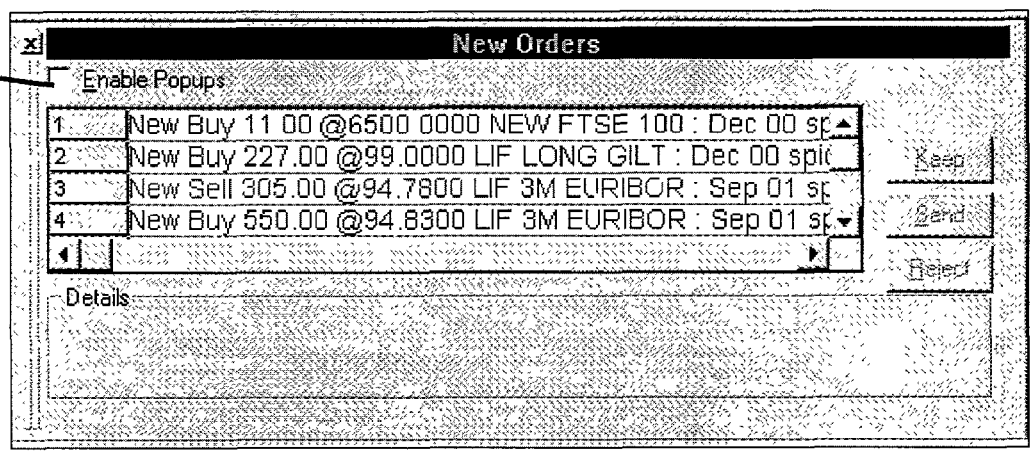
FIG. 6 is an example of an interface of a preferred embodiment.

FIG. 6 is an example of a New Orders window. The New Orders window lists all new pending orders for which the user has access. (Generally, a user has access to an order until an exchange accepts the order.) Once the exchange has accepted the order, the order no longer appears on the New Orders window. In the preferred embodiment, the New Orders window is a docked window and fixed at the bottom of the Workspace. The New Orders window may also permit the user to display each new order in a popup window even if the Interface is not running by selecting the "Enable Popups" option box 61. The popup window closes once the exchange has accepted the order.

If an order is not executed immediately, the user may modify the order. Additionally, if an order is being optionally executed from internal inventory, or another exchange, there may be a special indicator on the order. The user could then select the order to get details of the proposed execution, or to change the proposed execution.

Figure 7:
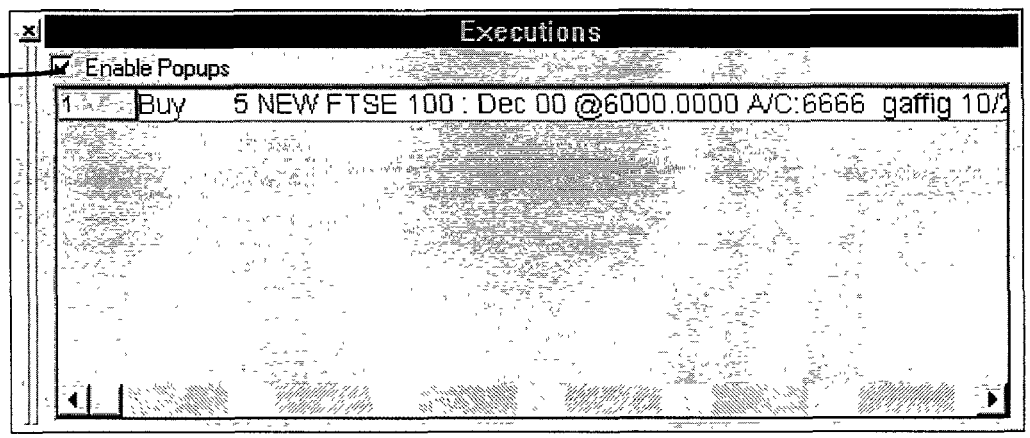
FIG. 7 is an example of an interface of a preferred embodiment.

After an exchange accepts an order the orders details are displayed in the Executions window. FIG. 7 is an example of an Executions window. The Executions window lists all newly executed orders. The Executions window is a docked window, fixed at the bottom of the workspace. The user may delete an executed trade from the Executions window as desired. The trade is then deleted from the Executions window. The Executions window may also permit the user to display each execution in a popup window even if the Interface is not running by selecting the "Enable Popups" option box 71.

FIG. 8 is an example of a MarketDepth window. The MarketDepth window displays the highest bids and lowest offers for the selected product. After the MarketDepth window is displayed a Buy or Sell order may be selected at the preferred level. In this example the available levels are 6256.5, 6256.8, etc. After selection, an Order Entry window displays the selected MarketDepth information. The user then selects either the Buy or Sell buttons to send the order to the exchange.

A user has the option to cancel, reject or correct an order that is not complete, e.g., a New or Pending order. In a preferred embodiment, the cancellation, rejection and correction of orders are performed through the Order View window, the MarketDepth window or the MarketWatch window. FIG. 5A shows an example of a pop up providing the user with an option to select various choices.

Figure 9:
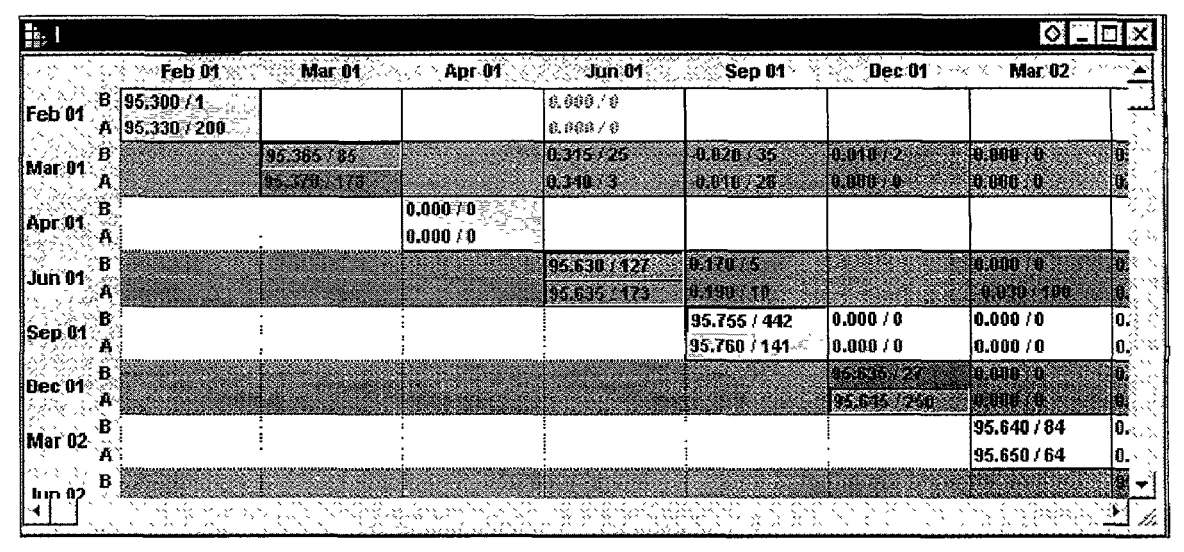

Some specialized derivative products may have their own window. For example, Calendar Spreads (a strategy in which the options have the same strike price and different expiration dates) may be entered through a Spread/Options Matrix window, shown in FIG. 9, which is reached by way of the Spread/Options Matrix icon in FIG. 2 (or a Spread/Options Matrix file menu selection not shown.) The user selects either the Bid or Ask price desired. An order entry window will then display the selected Spread/Options Matrix information. The user selects 'Buy' or 'Sell' to enter the order. Other options may use an Options matrix, configured for a particular instrument.

Returning to FIG. 1, and the embodiments therein, the intermediate components are shown generally at b. In the preferred and other embodiments, the intermediate components route orders from the trader interface and supply the trader interface and software with market, product information and other information. The intermediate components also transfer information from the interface. The intermediate components of this embodiment, seen in section b, comprises a number of components; Product Master 17, Market Data 18, User Profile 19, and OMA Extensions 20.

Product Master component 17 provides a cache for static and semi static information about any particular instrument, such as symbol, tick size (including fractions or decimals), etc. This information is supplied by various information sources, such as those shown generally at c of FIG. 1 of this embodiment, for example, Product Server 21, which may be supplied by external databases, such as Database 22.

Figure 10:
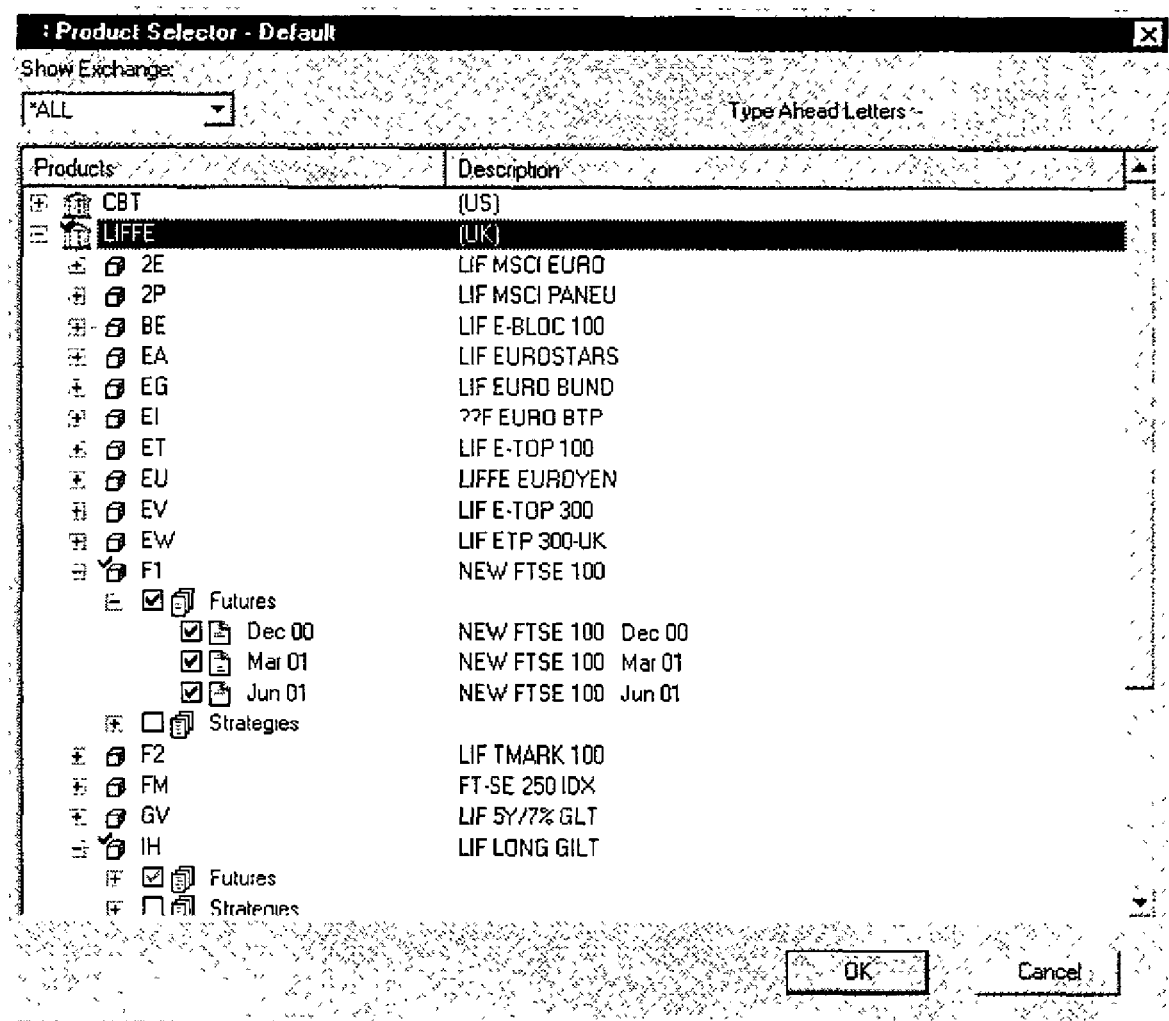
FIG. 10 is an example of an interface of a preferred embodiment.

Products may be added or deleted from the system by the user or another. In either instance, Product Manager 17 will be modified accordingly. For example, one method used in the preferred embodiment is to provide the user with a "Select Products" option from the MarketWatch menu, and a Product Selector window, such as that shown in FIG. 10, is provided. The Product Selector window allows the user to select exchange, product, and any contract information (such as is seen in derivatives trading) to be added to the MarketWatch window. Products may also be added by entering product information such as:

Exchange;
Underlier (Company);
ProductType;
Put/Call;
Strike Price;
Expiration date.

Returning to FIG. 2, Market Data 18 receives dynamic product and market information from Feed Handler 23, which is one of the information sources in this embodiment. Feed Handler 23 in turn receives data from a number of sources, such as those seen at 24 (e.g. Reuters/SSL, RTS, etc.).

Also seen in FIG. 2 is User Profile component 19, which stores user preferences for the trader interface and software. Preferences include, in the preferred embodiment, the user's workspace layout, settings (color schemes etc.), and configurations such as the type and form of information to be displayed. A user can store several preferences and retrieve them from a local or remote database, depending upon the embodiment, in order to accommodate different trading scenarios. For example, a user may want to use a particular workspace when employment statistics are released. The User Profile component 19 allows the user's default workspace and any special workspace(s) to be stored and instantly accessed.

OMA Extensions component 20 connects the interface and software to information source for routing orders. In the embodiment of FIG. 1, an Order Management Architecture 25 ultimately executes the order through links to an exchange or exchanges shown at 26.

Returning now to FIG. 2, the interface shown generally at 10 therein illustrates a user's view of the system, which is retained, in the preferred embodiments, on the local machine. The sub interface or windows in the Figure are similarly retained on the local machine, however their content is received from the server or servers, which, in this embodiment, are on remote machines, shown generally at b in FIG. 1. Other embodiments might have the interface, software and intermediate components on a local machine.

If the local system or the external systems experience a crash, the system may maintain trader's position. The preferred embodiments also notify the user of the outage by turning the interface gray. The gray color also prevents further entry of information. As seen by FIG. 2 at 42, an indicator is also available in this embodiment that indicates the Market-Data status.

As mentioned above, customization is yet another feature of the preferred embodiments through the User Profile and the storage of trader or user preferences as discussed above. Customization also includes storage of the user's preferences when the user logs off of the system. For example, the user may reconfigure the grids seen in some sub windows. (The grid configuration allows the user to utilize multi-column sorting, to import the screen to a spreadsheet program etc.) A user's last grid reconfiguration is stored in the User Profile object when the user logs off of the system.

In alternate embodiments, the current invention is in the form of an article, or signal-bearing medium, containing computer readable code. Examples of such articles include CD-ROMs and floppy disks. The present invention is then either broadcast or distributed to a group of users or traders over a networked system, or installed onto individual nodes such as computer terminals.

It will be appreciated that, although specific embodiments of the invention have been described herein for purposes of illustration, various modifications may be made without departing from the spirit and scope of the invention. In particular, the present invention is also used to enter trades involving stocks or other financial product.

We claim:

1. An apparatus for executing and processing financial instrument transactions comprising:
    a memory;
    a processor disposed in communication with said memory wherein said memory stores a plurality of processor-issuable processing instructions to provide an interaction interface having a plurality of interaction interface mechanisms, comprising:
        a presentation layer further comprising at least one subview reconfigurable workspace;
    at least one intermediate component layer for supplying information to each subview reconfigurable workspace and transferring information from an interface;
    at least one information source layer for supplying information to said intermediate component and transferring information from said intermediate component;
    wherein said subview reconfigurable workspace further comprises at least one sub interface, which sub interface is selected from the group comprising an order entry interface, an order modification interface, an order monitoring interface, an instrument monitoring interface, and a market monitoring interface;
    wherein said intermediate component layer is comprised of a plurality of intermediate components selected from a predetermined group of intermediate components, wherein said selection occurs at least in part based upon the sub interface or sub interfaces chosen;
    said intermediate components of which said intermediate component layer is comprised including:
        (a) a first intermediate component that provides a cache for information concerning financial instruments; and
        (b) a second intermediate component that stores user preferences for at least one subview reconfigurable workspace;
    wherein said user preferences stored in said second intermediate component include at least one of: (i) a layout of at least one subview reconfigurable workspace; and (ii) a color scheme; wherein at least one subview reconfigurable workspace comprises a plurality of windows.

2. A processor implemented method for executing and processing financial instrument transactions comprising:
    displaying by a processor a presentation layer further comprising at least one subview reconfigurable workspace;
    supplying information to an interface and transferring information from the interface through at least one intermediate component layer;
    supplying information to said intermediate component layer and transferring information from said intermediate component layer through at least one information source layer;
    wherein said subview reconfigurable workspace further comprises at least one sub interface, which sub interface is selected from the group comprising an order entry interface, an order modification interface, an order monitoring interface, an instrument monitoring interface, and a market monitoring interface;
    wherein said intermediate component layer is comprised of a plurality of intermediate components selected from a predetermined group of intermediate components, wherein said selection occurs at least in part based upon the sub interface or sub interfaces chosen;
    said intermediate components of which said intermediate component layer is comprised including:
        (a) a first intermediate component that provides a cache for information concerning financial instruments; and
        (b) a second intermediate component that stores user preferences for at least one subview reconfigurable workspace;
    wherein said user preferences stored in said second intermediate component include at least one of: (i) a layout of at least one subview reconfigurable workspace; and (ii) a color scheme; wherein at least one subview reconfigurable workspace comprise a plurality of windows.

3. An apparatus as in claim 1 wherein said sub interface further comprises a window.

4. An apparatus as in claim 1 wherein said at least one subview reconfigurable workspace is user configurable.

5. An apparatus as in claim 4 wherein said at least one subview reconfigurable workspace has a default configuration.

6. An apparatus as in claim 2 wherein said sub interface further comprises a window.

7. A method as in claim 2 wherein said method further comprises the step of trading a financial instrument through said user interface.

8. A method as in claim 7 wherein said step of trading financial instruments through said user interface further comprises trading said instrument through aggregate pricing of said instrument.

9. An apparatus as in claim 1, wherein said user preference for said layout of said at least one subview reconfigurable workspace prescribes a subview reconfigurable workspace layout that varies according to a trading event for a day of the week.

10. An apparatus as in claim 1, wherein said user preferences stored in said second intermediate component include a color scheme.

11. A method as in claim 2, wherein said user preference for said layout of said at least one subview reconfigurable workspace prescribes a subview reconfigurable workspace layout that varies according to a trading event for a day of the week.

12. A method as in claim 2, wherein said user preferences stored in said second intermediate component include a color scheme.

* * * * *